United States Patent
Zad Tootaghaj et al.

(10) Patent No.: US 12,335,123 B2
(45) Date of Patent: Jun. 17, 2025

(54) DISTRIBUTED NETWORK MONITORING

(71) Applicant: HEWLETT PACKARD ENTERPRISE DEVELOPMENT LP, Spring, TX (US)

(72) Inventors: Diman Zad Tootaghaj, San Jose, CA (US); Mehrnaz Sharifian, Granite Bay, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 154 days.

(21) Appl. No.: 18/193,879

(22) Filed: Mar. 31, 2023

(65) Prior Publication Data
US 2024/0333622 A1    Oct. 3, 2024

(51) Int. Cl.
  *G06F 15/16* (2006.01)
  *H04L 43/045* (2022.01)
  *H04L 43/0876* (2022.01)
  *H04L 43/16* (2022.01)

(52) U.S. Cl.
  CPC ........ *H04L 43/0876* (2013.01); *H04L 43/045* (2013.01); *H04L 43/16* (2013.01)

(58) Field of Classification Search
  CPC .... H04L 43/0876; H04L 43/045; H04L 43/16
  USPC ........................................................ 709/224
  See application file for complete search history.

(56) References Cited

U.S. PATENT DOCUMENTS

| | | | |
|---|---|---|---|
| 7,631,034 B1 * | 12/2009 | Haustein | G06F 9/505 709/201 |
| 8,447,851 B1 * | 5/2013 | Anderson | G06F 11/3006 709/224 |
| 8,666,804 B2 * | 3/2014 | Barnes, Jr. | G06Q 30/0601 705/14.1 |
| 8,886,162 B2 * | 11/2014 | Raleigh | H04L 41/5003 455/432.1 |
| 8,886,790 B2 * | 11/2014 | Harrang | H04L 47/2416 709/224 |
| 8,959,217 B2 | 2/2015 | Mayo et al. | |
| 9,923,918 B2 * | 3/2018 | Nicodemus | H04L 63/20 |
| 10,248,657 B2 * | 4/2019 | Prahlad | G06F 16/1748 |
| 11,200,110 B2 * | 12/2021 | Upadhyay | G06F 11/3419 |
| 11,218,364 B2 * | 1/2022 | Shevade | H04L 41/0806 |
| 11,528,187 B1 * | 12/2022 | Volpe | H04L 41/0816 |

(Continued)

OTHER PUBLICATIONS

Firestone et al., "Azure Accelerated Networking: SmartNICs in the Public Cloud", In 15th {USENIX} Symposium on Networked Systems Design and Implementation, 2018, 14 pages.

(Continued)

*Primary Examiner* — Moustafa M Meky
(74) *Attorney, Agent, or Firm* — Trop, Pruner & Hu, P.C.

(57) ABSTRACT

A device and corresponding method are provided determining a consumed computing capacity of a first networking device exceeds the threshold for total capacity for processing monitoring data for a monitoring metric. An optimization engine determines a second networking device with unused computing capacity sufficient for processing the monitoring data generated by the first networking device. The optimization engine automatically moves the monitoring data for the monitoring metric generated by the first networking device to the second networking device and causes the second networking device to process the monitoring data.

19 Claims, 9 Drawing Sheets

(56) References Cited

U.S. PATENT DOCUMENTS

| | | | | |
|---|---|---|---|---|
| 11,576,109 | B2* | 2/2023 | Mhapsekar | H04W 48/16 |
| 2016/0344604 | A1* | 11/2016 | Raleigh | H04L 43/0876 |
| 2017/0310432 | A1* | 10/2017 | Callaghan | H04L 1/244 |
| 2018/0176093 | A1* | 6/2018 | Katz | G06F 9/5061 |
| 2022/0197773 | A1 | 6/2022 | Butler et al. | |
| 2022/0263843 | A1* | 8/2022 | Aslam | G06N 7/01 |
| 2022/0385673 | A1* | 12/2022 | Dong | G06N 20/00 |
| 2023/0095986 | A1* | 3/2023 | Gagula | H04L 43/16 |
| | | | | 709/226 |
| 2024/0146618 | A1* | 5/2024 | Lifshitz | H04L 43/028 |

OTHER PUBLICATIONS

Gedik et al., "PeerCQ: A Decentralized and Self-Configuring Peer-to-Peer Information Monitoring System", Proceedings of the 23rd International Conference on Distributed Computing Systems, 2003, 10 pages.

Hao et al., "Dynamic Practical Byzantine Fault Tolerance", IEEE Conference on Communications and Network Security (CNS), 2018.

Newhall et al., "PeerMon: A Peer-to-Peer Network Monitoring System", Nov. 2010, 13 pages.

Ni et al., "Advancing Network Function Virtualization Platforms with Programmable NICs", IEEE, 2019, 6 Pages.

Wang et al., "A communication cooperation mechanism in distributed systems", ACM SIGOPS Operating Systems Review, 1993, 12 pages.

* cited by examiner

DISTRIBUTED NETWORK MONITORING

INTRODUCTION

Large-scale networks, such as those that may be found in a data center, enterprise, campus, government facility, etc., may comprise many networking devices (e.g., switches, routers, wireless access points, and smart Network Interface Cards (NICs)) for routing data. Generally, each networking device has a computer processor, other hardware components (e.g., a switching ASIC, communication ports, transceivers, and antennas in the case of wireless APs, etc.), and software components (e.g., firmware, drivers, etc.).

One approach to monitoring the health or other metrics of network devices in a network is on-device monitoring. On-device monitoring uses monitoring agents installed on each networking device to generate and process monitoring data for monitoring metrics for the networking device. On-device network monitoring detects anomalies, detects the root cause of failures and monitors the health of the networking devices.

BRIEF DESCRIPTION OF THE DRAWINGS

The present disclosure can be understood from the following detailed description, alone or with the accompanying drawings. The drawings are included to further understand the present disclosure and are incorporated in and constitute a part of this specification. The drawings illustrate one or more examples of the present teachings and, together with the description, explain certain principles and operations. In the drawings.

DETAILED DESCRIPTION

Figure 1:
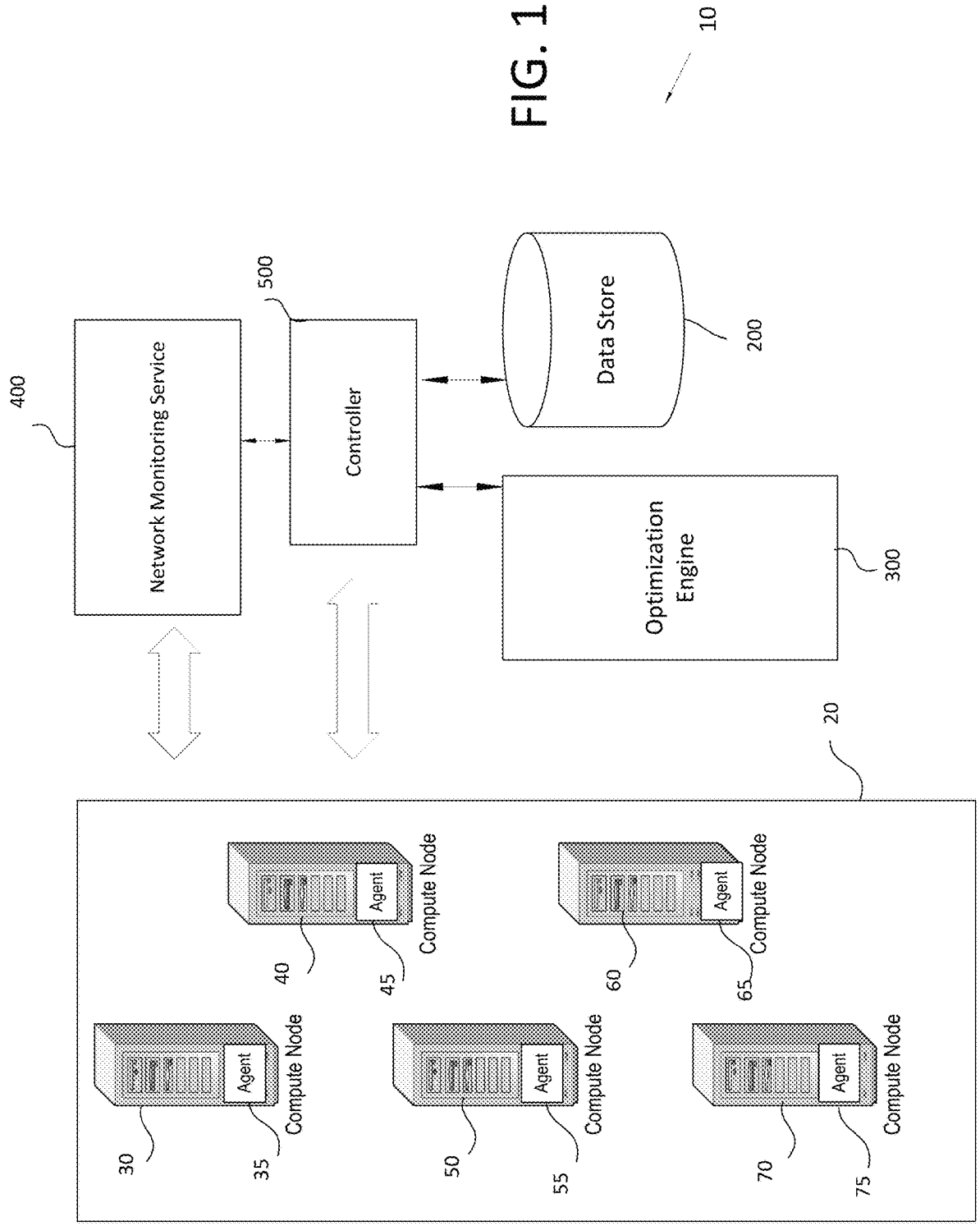
FIG. 1 is a block diagram illustrating a computing system in accordance with the examples set forth herein.

Network downtime is expensive and can impact the reputation of the company. Therefore, network monitoring is important for enterprise and data center networks. Traditionally, network monitoring has been centralized and analyzed based on packet traces such as sFlow and NetFlow.

In a decentralized networking monitoring configuration, network monitoring agents are installed by a network monitoring service (NMS) on each networking device in the network. The networking devices may comprise switches, routers, access points, servers, smart network interface cards (smartNICs), or other devices capable of processing and communicating information. Some devices, such as a data center switch, may include multiple application-specific integrated circuits (ASIC) and/or multiple smartNICs. The network monitoring agents are hardware agnostic monitor and are installed on each of the multiple ASICS and/or smartNICs Network monitoring agents may be installed on single unit devices as well as each of multiple integrated circuits such as ASICS, NICs and smartNICs across an enterprise or data center network. Integrated circuits, such as ASICS, NICs and smartNICs may be referred to as network fabric. The network monitoring agents are responsible for both generating and processing monitoring data for various metrics (described below). Each networking device, via its network monitoring agents, generates and processes its own monitoring data. For example, for a monitored first switch, the central process unit (CPU) and memory of the first switch generates and process the monitoring data for the first switch's monitoring metrics.

Once a monitoring agent for a metric is installed on a networking device, the networking device, via the installed monitoring agent, generates and processes the monitoring data for the networking device metric. The monitoring metrics for which monitoring data is generated comprise metrics for monitoring the health, status, and performance of the networking device, such as CPU and memory usage, transceiver TX and RX power levels, link state advertisement (LSA) counters, link aggregation (LAG) health, or other metrics related to protocols utilized by the networking devices, such as routing protocols (OSPF), virtual router redundancy protocol (VRRP), such as packet error count monitoring, and spanning tree protocol (STP). Other monitoring metrics may include fan monitoring, interface monitoring, such as interface link flaps, interface link states, and interface tx rx statistics, lag monitoring including lag imbalance and lag status, power supply monitoring, system resource monitoring, temperature sensor monitoring. Monitoring metrics may be user defined and any number of monitoring may be used.

The monitoring agent installed on the networking device generates, processes, and tracks the data for the monitoring metric over time. A monitoring agent may generate time-series data for the metric being monitored. The monitoring agent processes the data for the monitoring metric to produce an alert if an anomaly is detected in the generated data. The monitoring agent may perform network diagnostics and may perform corrective actions if the monitoring agent detects an anomaly in generated data.

The monitoring agent may populate time series data for a monitoring metric to a local database. Monitoring metric time series data is populated to the table for the local database. In examples, the local database is a vSwitch Database Management Protocol (OVSDB) for storing monitoring metric time series data, network configurations, states, and statistics in database tables. In this example, a monitoring agent subscribes to a table in the data store 200. Monitoring agents may communicate alerts and data to the OSVDB, a network administrator, or some other device for additional processing or for notifying a network administrator of an alert or anomaly.

Although on-device monitoring is helpful for providing in-depth health analysis and diagnostics, generating and processing data by multiple monitoring agents for multiple metrics on a single monitored networking device can be compute-heavy and disrupt the normal functionality of that networking device. For example, some networking devices, such as relatively inexpensive access layer switches, may have processors with limited processing capabilities. The combination of the processing overhead associated with the monitoring agents and the other processing tasks of the network device may saturate the processors and result in performance slowdowns. Moreover, even highly capable devices can overwhelm their processing resources when sufficiently loaded. In some cases, when the processing capabilities of a networking device are exceeded due to network monitoring overhead, the device may not just slow down but may also experience a failure (e.g., shut down, network downtime or reboot).

To avoid overloading networking devices from network monitoring, examples disclosed herein may utilize a distributed network monitoring placement technique that efficiently moves generated monitoring data for a networking device to another networking device (or multiple other networking devices) with the capacity for processing. Distributed network monitoring placement techniques disclosed herein leverage available compute resources across the network. That is, the monitoring data may still be generated at each individual networking device, but instead of each individual networking device processing its own monitoring data, some networking devices may have some (or all) of their monitoring data processed by other networking devices in the network. Distributed network monitoring placement helps prevent networking devices from overloading or failing because the networking device utilizes too much CPU processing and memory to monitor multiple metrics. Distributed network monitoring placement also increases the scalability of the monitoring metrics, as monitoring is no longer limited to the resources of each individual networking device. For example, networking devices that may be at risk of having their processing capacity overwhelmed, such as networking devices that are currently experiencing a large load, can offload the processing of their monitoring data to other networking devices that may have excess processing capacity, such as a networking device that is currently less loaded. Therefore network monitoring can still occur for each network device even when some devices are too loaded to perform the monitoring themselves. Moreover, the distributed monitoring system allows the processing of generated monitoring data to run on a distributed set of networking devices instead of a single monitored networking device. Low-profile networking devices, such as low-profile ASIC, NIC or smartNIC cards, may also be monitored on a distributed set of networking devices to assist with running monitoring agents in a low-profile networking device. To reduce network congestion that might arise due to the communication of the monitoring data between the networking devices, when determining which networking devices should perform the processing for other networking devices, the system may attempt to minimize the total data movement of monitoring data in the network.

Note that the networking devices that gather the monitoring data and/or to which the processing of the monitoring data may be assigned do not necessarily have to be discrete systems or devices, but may also be individual components of larger systems or devices. For example, a switch might include multiple processing resources (e.g., multiple ASICs) and each one of these processing resources may be considered as a separate "networking device" for purposes of the techniques disclosed herein, notwithstanding being part of the same switch. In other words, the distributed network monitoring placement techniques disclosed herein may utilize any processing resources within the network for gathering networking monitoring data and/or for processing of monitored data.

In some examples, an optimization engine is provided for determining distributed network monitoring placement. The optimization engine can determine distributed network monitoring placement for a full mesh topology network and a general topology network with defined routes. In a full mesh topology, all networking devices in the network can communicate with one another. In a general topology, any networking device is connected to any other networking device in the network, but all networking devices cannot communicate directly with one another. Defined (or uncontrollable) routes require data to flow in a defined direction from one networking device to another.

In some examples, the optimization engine may determine the monitoring placements by creating and analyzing a bipartite graph. The graph G comprises a collection of vertices U representing the networking device(s) whose monitoring data needs to be moved, a collection of vertices V representing the networking devices that are candidates to receive the monitoring data, and edges E connecting the vertices U to the vertices V with each of the edges E representing a property (e.g., estimated time to move the monitoring data) associated with a communication path between one of the networking devices in set U and one of the networking devices in set V. The optimization engine may use the bipartite graph to determine the cost of moving the generated data from a monitored networking device in U to another networking device in V. In some examples, the cost is defined as the amount of data that is being moved from a monitored networking device to another networking device. In other examples, the cost is defined as the latency associated with the data movement from the monitored networking device to another networking device. In this context, latency of the data movement means the amount of time it takes to move the monitoring data across a route (link or series of links). In some examples, latency is the amount of time it takes to move all of the monitoring data from a networking device across a route (link or series of links).

In some examples, the candidate networking devices that are included in the set of vertices V include those of the networking devices with enough capacity to process the monitoring data from one of the monitored networking devices of the set of vertices U and that also have a route from the monitored networking device that meets a minimum bandwidth and has low latency. By analyzing the graph, the optimization engine can determine optimal pairings between the networking devices in the set U to the networking devices in the set V that result in the least overall cost to the system, with cost being measured in terms of data movement (e.g., the latency for moving the monitoring data). For example, the optimization engine may utilize the Hungarian approach (described further below) to determine the optimal pairings. For example, if just one networking device needs to have its monitoring data offloaded, the optimization engine would select a networking device to receive the monitoring data that has the fastest route for moving the generated data from the monitored networking device.

In examples, a first set of networking devices exceeds a threshold for total capacity used. The optimization engine determines a second set of networking devices in the network with available computing capacity for processing the monitoring data generated by each of the first set of networking devices. The optimization engine determines a route for each of the first set of networking devices to each networking device of the second set of networking devices. The optimization engine then selects, for each of the first set of networking devices (U), a networking device (V) from the second set of networking devices to move monitoring data for processing. The optimization engine determines an available direct path (route) between each U to V networking device. The optimization engine selects the optimized destination networking device (V) for each overloaded networking device (V). The optimization engine makes these selections using a novel modeling of the problem as a bipartite graph and novel algorithm inspired by the Hungarian approach to minimize the overall cost to the network for moving the data from each of the first set of networking devices to a networking device from the second set.

Turning now to the figures, various devices, systems, and methods in accordance with aspects of the present disclosure will be described.

FIG. 1 is a block diagram illustrating a system 10 comprising a group of networking devices 20, a data store 200, an optimization engine 300, a network monitoring service (NMS) 400, and a controller 500. Each of the controller 500, networking monitoring service 400, and optimization engine 300 may be instantiated on or by processing circuitry comprising one or more processors executing machine readable instructions and/or dedicated hardware (e.g., an Application Specific Integrated Circuit (ASIC), Field Programmable Gate Array (FPGA), Complex Programmable Logic Device (CPLD), etc.) configured to perform operations described herein. In some examples, some or all of the controller 500, networking monitoring service 400, and optimization engine 300 may be instantiated on or by the same processing circuitry of the same electronic device, while in other examples the controller 500, networking monitoring service 400, and optimization engine 300 may be instantiated on or by different processors of different devices.

The group of networking devices 20 comprises multiple networking devices, such as the networking devices 30, 40, 50, 60, and 70 illustrated in FIG. 1, that are communicably connected to one another to store, transfer, and access digital information. The networking devices 30, 40, 50, 60, and 70 may comprise switches, routers, access points, servers, smart network interface cards (smartNICs), smart ASICs, or other network fabric devices capable of processing and communicating information. Each networking device 30, 40, 50, 60, and 70 has a processor and memory. As used herein, a processor refers to any processing circuitry, which may include general-purpose processors such as a CPU or GPU or more dedicated processing hardware or accelerators such as ASICs, Field Programmable Gate Arrays (FPGAs), Complex Programmable Logic Devices (CPLD), etc. Such processors or dedicated processing hardware may also be referred to herein as processing resources.

In some examples, one or more of the networking devices 30, 40, 50, 60, and 70 comprise smart fabric devices, such as smartNICs or Smart ASICs. The smartNICs may be similar to traditional NICs in that they are modules that can be installed in other devices (such as servers) to provide network interface functions for the device. Still, unlike traditional NICs, the smartNICs may comprise additional processing capabilities. Thus, the smartNICs may act as Data Processing Units (DPUs) and can offload various jobs from the devices in which they are installed (e.g., servers). For example, DPUs can be deployed in data centers to offload network and remote direct access memory (RDMA) functionalities freeing server resources for application workloads. In one example, smartNICs/DPUs are deployed in network switches to offload certain functionalities of the network switches. A Smart ASIC may similarly be configured to act as DPU and can offload various jobs from the devices in which they are installed.

The group of networking devices 20 are connected via any desired type of networking technology using any desired communication protocol and in any desired network topology. For example, the networking devices 20 may be connected via a local area network (LAN), WLAN, or SD-WAN, creating a network that links networking devices 30, 40, 50, 60, and 70. The network may be connected by cables or wireless technology for routing traffic between the networking devices 30, 40, 50, 60, and 70.

Network monitoring service (NMS) 400 assists with decentralized monitoring, maintaining, and updating the group of networking devices 20. The NMS 400 installs monitoring agents 35, 45, 55, 65, and 75 on the networking devices 20 to remotely monitor the networking devices 20 and generate, process, and track data for monitoring metrics over time. Each monitoring agent 35, 45, 55, 65, and 75 may be configured to monitor at least one corresponding monitoring metric. Each networking device 30, 40, 50, 60, and 70 has at least one monitoring agent 35, 45, 55, 65, and 75. In some examples, multiple monitoring agents 35, 45, 55, 65 and 75 may be installed on the same networking device 30, 40, 50, 60, and 70 to monitor multiple metrics. Monitoring agents 35, 45, 55, 65, and 75 may generate time-series data for the metric being monitored. The monitoring agent 35, 45, 55, 65, and 75 that generates monitoring data for a corresponding metric generally processes the data for the monitoring metric unless the task of processing the monitoring data has been moved to another device, as will be described in greater detail below. The processing of the monitoring data may include, for example, analyzing the data to detect anomalies and taking predetermined actions, such as producing an alert if an anomaly is detected in the generated data. The monitoring agent 35, 45, 55, 65, and 75 may perform network diagnostics and may perform corrective actions if the monitoring agent detects an anomaly in generated data.

The monitoring metrics for which monitoring data is generated comprise metrics for monitoring the health, status, and performance of the networking device, such as CPU and memory usage, transceiver transmitter (TX) and receiver (RX) power levels, link state advertisement (LSA) counters, link aggregation (LAG) health, or other metrics related to protocols utilized by the networking devices, such as routing protocols (OSPF), virtual router redundancy protocol (VRRP), and spanning tree protocol (STP).

The monitoring agents 35, 45, 55, 65, and 75 may be in communication with the NMS 400 to provide the network administrator with data to manage the maintenance and update the group of networking devices 20 without having to physically interact with each networking device 30, 40, 50, 60, and 70. In addition to generating and processing the monitoring data as described above, the monitoring agents may also perform other functions. NMS 400 instantiates monitoring agents 35, 45, 55, 65 and 75 to generate time-series data for monitoring metrics. The monitoring agents 35, 45, 55, 65, and 75 are helpful for performing an in-depth analysis for network monitoring. NMS 400 may create alerts with condition met based on generated time-series data for monitoring metrics.

This time series data and alerts are generated and stored locally on the networking devices 20. Time series data and alerts may be communicated to controller 500 to determine to offload monitoring metrics data for processing to a second networking device (as discussed in more detail below), Monitoring agents 35, 45, 55, 65, and 75 may also provide in-situ data compression and packet parsing. Data compression and packet parsing of a large set of time-series data assist with offloading time-series data for processing to a second networking device.

The monitoring agents 35, 45, 55, 65, and 75 may be instantiated in the networking devices 30, 40, 50, 60, and 70 by the processor(s) executing logic (e.g., machine-readable instructions) corresponding to the agent's operations. Thus, because the monitoring agents 35, 45, 55, 65, and 75 are instantiated by the processors of the networking devices 30, 40, 50, 60, and 70, the operations of the monitoring agents 35, 45, 55, 65 and 75 utilize some of the computation power and memory of the networking devices 30, 40, 50, 60, and 70. In some instances, utilization of the computation power and/or memory by the monitoring agent may cause the processor and/or memory to become saturated (e.g., at or near 100% utilization), which can degrade performance and interfere with regular processing of the networking device 30, 40, 50, 60 and 70. For example, suppose one of the networking devices 30, 40, 50, 60, and 70 is experiencing heavy traffic. In that case, the processor and/or memory thereof may already be close to saturation even without considering the additional overhead of the monitoring agent. Thus, adding the monitoring agent's overhead in such a state may fully saturate the processor and/or memory. In some cases, when the processing and/or memory of a networking device 30, 40, 50, 60, and 70 becomes fully saturated, this may slow down the performance of the device; furthermore, in some cases, the saturation may not cause just case slowdowns but may result in further negative effects such as crashes or rebooting of the device leading to network down time. To avoid these results, examples described herein may remove the task of processing of monitoring data from heavily loaded networking devices 30, 40, 50, 60, and 70, and redistributes monitoring data across the network by leveraging available compute resources of other networking devices across the network as will be described in greater detail below.

Controller 500 manages in-device network monitoring using monitoring agents 35, 45, 55, 65, and 75, combined with information about current state and resource utilizations of the devices in the network to improve network monitoring and predict network faults ahead of time. In one example, a controller 500 reads incoming and outgoing data in the network for analysis. In one example, controller 500 reads incoming and outgoing data to and from controller 500 to networking devices 20. The controller 500 may be integrated with an existing NMS or may be implemented as part of a new NMS.

Controller 500 aggregates data across the underlying network. For example, controller 500 aggregates and monitors data packets generated by monitoring agents 35, 45, 55, 65, and 75 for networking devices 20. Controller 500 communicates with data store 200, aggregating and storing time series data for monitoring metrics for networking devices 20 across the network. Controller 500 provides a central point of configuration and management for the on-device monitoring and provides a centralized overview of the network and monitoring data management. This is in contrast to other on-device monitoring approaches in which the individual devices gather and process their own monitoring data while being largely ignorant of the monitoring going on at other devices. In other words, while the monitoring is still carried out in a distributed fashion among the networking devices 20, the control over how that monitoring is distributed may be centralized in the controller 500 which is able to see the status of the entire network. This allows the controller 500 to optimize how monitoring tasks are distributed among the networking devices, using the optimization engine 300 as described in greater detail below, while also retaining the benefits of distributed on-device monitoring.

Data store 200 maintains the current state of network, topology, utilized switch and link utilizations, and provide information to assist optimization engine 500 in determining a second networking device to offload the destination node for offload. Time series data and alerts may be received from monitoring agents 35, 45, 55, 65, and 75 of networking devices 20.

The data store 200 may be maintained by the NMS 400 or may be maintained separately. Data store 200 stores and maintains monitoring metric time series data for one or more networking devices 20. In one example, controller 500 receives a log from a monitoring agent of a networking device for a monitoring metric. The data store 200 maintains the log and data for the monitoring metrics and networking device. As additional data (packets) are received by the controller, the data store 200 is updated with the time series associated for the monitoring metric for the networking device.

Optimization engine 300 is configured to control where the processing of the monitoring data generated by the monitoring agents 35, 45, 55, 65 and 75 occurs. As noted above, the default arrangement is for the monitoring agent that generates the monitoring data to process that monitoring data. However, in some cases (discussed below), the optimization engine 300 may cause a different networking device 30, 40, 50, 60, or 70 to perform the task of processing the monitoring data from another networking device 30, 40, 50, 60, or 70. The optimization engine 300 is configured to determine when such reassignment of the processing of the monitoring data should occur, and also which networking device 30, 40, 50, 60, or 70 the processing should be reassigned to. The optimization engine 300 may utilize a data set of monitoring data for one or more monitoring metrics from data store 200 to make these determinations. The optimization engine 300 may reassign the processing of the monitoring data to networking devices such as smart fabric devices (Smart NICs or Smart ASIC), servers, regardless of type of networking device generating the monitoring data. For example, monitoring data for a switch or server may be reassigned for processing to a smart fabric device such as smart NICs or smart ASICS. The optimization engine 300 may be deployed in any type of network, such as private networks, public networks, and private and public cloud networks Optimization engine 300, determines based on the monitoring data, the consumed computing capacity of individual networking device 30, 40, 50, 60, and 70 (e.g., for each individual networking device 20 30, 40, 50, 60, and 70). Consumed computing capacity of a given networking device 20 30, 40, 50, 60, or 70 refers to the amount of overall processing capacity of the given networking device 20 30, 40, 50, 60, and 70 that has been consumed (e.g., a processor utilization percentage), the amount of overall memory capacity of the given networking device 20 30, 40, 50, 60, and 70 that has been consumed (e.g., a memory utilization percentage), or a combination of both the amount of overall processing capacity that has been consumed and the amount of overall memory capacity that has been consumed. computing capacity is determined for each networking devices 20 30, 40, 50, 60, and 70, but in some examples the computing capacity may be determined for a single networking device or for a subset of the networking devices. Based on the determined consumed computing capacity data, the optimization engine 300 determines, for individual networking devices 30, 40, 50, 60, and 70 (e.g., for each individual networking device 30, 40, 50, 60, and 70), if the consumed computing capacity of the networking device 20 30, 40, 50, 60, and 70 exceeds a threshold for total capacity. For example, if the consumed computing capacity comprises both processing and memory capacity, then in some examples, the consumed computing capacity may be considered to exceed the threshold for total capacity if either one of the processing and memory capacities exceeds the respective processing and memory capacity thresholds. If the consumed computing capacity of a given networking device exceeds the threshold for monitoring, this may be referred to herein as the networking device being overloaded.

Suppose the consumed computing capacity of one of the networking devices 30, 40, 50, 60, or 70 (hereinafter "first networking device") exceeds the threshold for total capacity. In that case, optimization engine 300 determines another one of the networking devices, 30, 40, 50, 60, or 70 (hereinafter "second networking device"), to which the task of processing the monitoring data of the first networking device will be reassigned. The optimization engine 300 may select as the second networking device one of the networking devices 30, 40, 50, 60, or 70 that has unused computing capacity sufficient for processing the monitoring data generated by the first networking device. The unused computing capacity of the second networking device comprises unused processing capacity and/or unused memory capacity of the second networking device. In some examples, the optimization engine 300 may also consider additional criteria when selecting the second networking device, such as criteria related to the routes connecting the first and second networking devices, as described further below. To simplify the discussion, it is assumed above that a single networking device is selected as the second networking device, but in some examples multiple networking devices can be selected to take on the processing of the monitoring data of the first networking device, with these networking devices each taking on different subsets of the monitoring data (e.g., monitoring data associated with different monitoring agents and/or metrics). In some examples, the first networking device is a switch, and the second networking device is a smartNIC. The second networking device may be local to the first networking device or may be remote.

Once the second networking device has been selected for the first networking device, the optimization engine 300 automatically moves at least some of the monitoring data generated by the first networking device to the second networking device and causes the second networking device to process the monitoring data. In some examples, the optimization engine 300 moves all of the monitoring data generated by all monitoring agents of the first networking device to the second networking device. In other examples, the optimization engine 300 may move the monitoring data generated by just a subset of the monitoring agents (e.g., one monitoring agent) of the first networking device to the second networking device. In some examples, after moving the monitoring data from the first networking device to a second networking device, it may be possible that the first networking devices becomes overloaded again (or remains overloaded notwithstanding the moving of the monitoring data). For example, the overloading may be due to processing monitoring data for additional monitoring agents besides the one(s) for which monitoring data was previously moved. These other monitoring agents may have been newly installed after the initial decision to move the monitoring data from the first networking device. Or in some examples the monitoring agents may have been installed at the time that the monitoring data was moved but the monitoring data that was moved may have been from another monitoring agent (e.g., the decision to move monitoring data may be made on an agent-by-agent basis, in some examples). Thus, in some examples the optimization engine 300 may periodically reassess the status of the networking devices, even ones for which monitoring data has already been moved, to determine if additional monitoring data needs to be off-loaded. Accordingly, in some examples the optimization engine 300 may determine again whether the first networking device becomes overloaded again, and if so may move the new monitoring data of an additional monitoring agent of the first networking device to another networking device (which may be the same networking device as which previously had monitoring data reassigned thereto, or another networking device). Processing the monitoring data comprises generating alerts based on the monitoring data and/or initiating corrective actions based on the monitoring data.

In some instances, multiple of the networking devices 30, 40, 50, 60, or 70 may be overloaded at the same time. In such cases, the optimization engine 300 may identify one or more additional networking devices to which the processing of these overloaded networking devices may be reassigned. The overloaded networking devices may also be referred to herein as a first set of networking devices and the one or more networking devices selected to take over the processing from the first set may be referred to herein as a second set of networking devices. The second set of networking devices may be chosen in similar manner as already described above. The second set of networking device can be, but does not have to be, congruent with the first set—that is, while each member of the first set is paired with at least one member of the second set, and vice versa, the pairings are not necessarily 1-to-1 and the number of devices in each set does not have to be the same. For example, a single networking device can take on the processing of monitoring data from multiple other networking devices, or multiple networking devices can take on respective subsets of the monitoring data from the same networking device. Thus, the first set can have fewer, the same, or more members than the second set. In some examples, the first set of networking devices are switches and the second set of networking devices are smartNICs.

When multiple of the networking devices 30, 40, 50, 60, or 70 are overloaded at the same time, the optimization engine 300 automatically moves the monitoring data generated by the first set of networking devices to the second set of respective networking devices and causes the second set of networking devices to process the monitoring data. The optimization engine 300 utilizes an optimization algorithm to determine a set of networking devices having unused computing capacity sufficient for processing the monitoring data generated by the networking device.

The optimization engine 300 utilizes the optimization algorithm to select the second networking device (or second set of networking devices) by first identifying one or more networking devices that satisfies one or more selection criteria. The selection criteria comprises the networking device having sufficient computing capacity to take on the processing of the monitoring data as already discussed above, and in addition, also comprises there being a route (link or series of links) from the first networking device to the second networking device that has available bandwidth for moving the monitoring data and a latency lower than a latency threshold. The objective function in the selection criteria is to minimize the total data movement cost. Once candidates that satisfy the selection criteria have been identified, the optimization engine 300 may select which of the candidate networking devices are to receive and process the monitoring data of which overloaded networking devices, wherein the assignments are chosen to minimize the costs (in terms of data movement) to the system. In other words, the optimization algorithm of the optimization engine 300 distributes processing assignments for monitoring data generated by overloaded networking devices among the remaining networking devices in a manner that minimizes a cost function representative of the cost of movement of monitoring data through the network. An example of the optimization algorithm is described in greater detail below with reference to FIGS. 2 and 3.

The optimization engine 300 efficiently offloads processing from busy network devices 20 onto network devices 20 with availability and capacity. In some examples, the optimization engine 300 can offload 20% of the total processing from a network device. At scale, there may be up to 50% of CPU capacity savings and 15% in memory capacity savings throughout the network.

The optimization engine 300 provides network-wide monitoring with in-depth analysis without requiring the extensive processing and storage capability that would be needed to perform a similar level of monitoring using a centralized monitor. In other words, while the controller 500 and optimization engine 300 do consume some processing resources in their roles of determining if and where to move the monitoring data, the level of processing resources needed for this is very small compared to doing the actual processing of the data centrally. The optimization engine 300 is a device-agnostic platform. Optimization engine 300 may be centrally or cloud-located and is communication with monitoring agents deployed on networking devices 20, such as switches, routers, wireless access points, and smart NICs) and ASICS. The optimization engine 300 provides efficient resource utilization that can be dedicated to network monitoring. In some examples, the optimization engine 300 prioritizes data locality and in-situ data compression using network devices 20, such as switches, to balance the using the compute resources of the networking device being monitor vs. connectivity trade-off of moving the monitoring data to a different networking device for processing. The optimization engine 300 provides distributed network monitoring that can be scaled and rendered fault tolerant.

Additional networking devices 20 with compute resources, such as smart NICs, are leveraged by the optimization engine 300 for device-level functionalities and boosting multi-dimensional scale. Networking devices 20, such as switches, have functionality for bridging and routing but can allocate some compute resources to monitoring the health of the networking device even though it may negatively affect functionality of the networking device.

Figure 2:
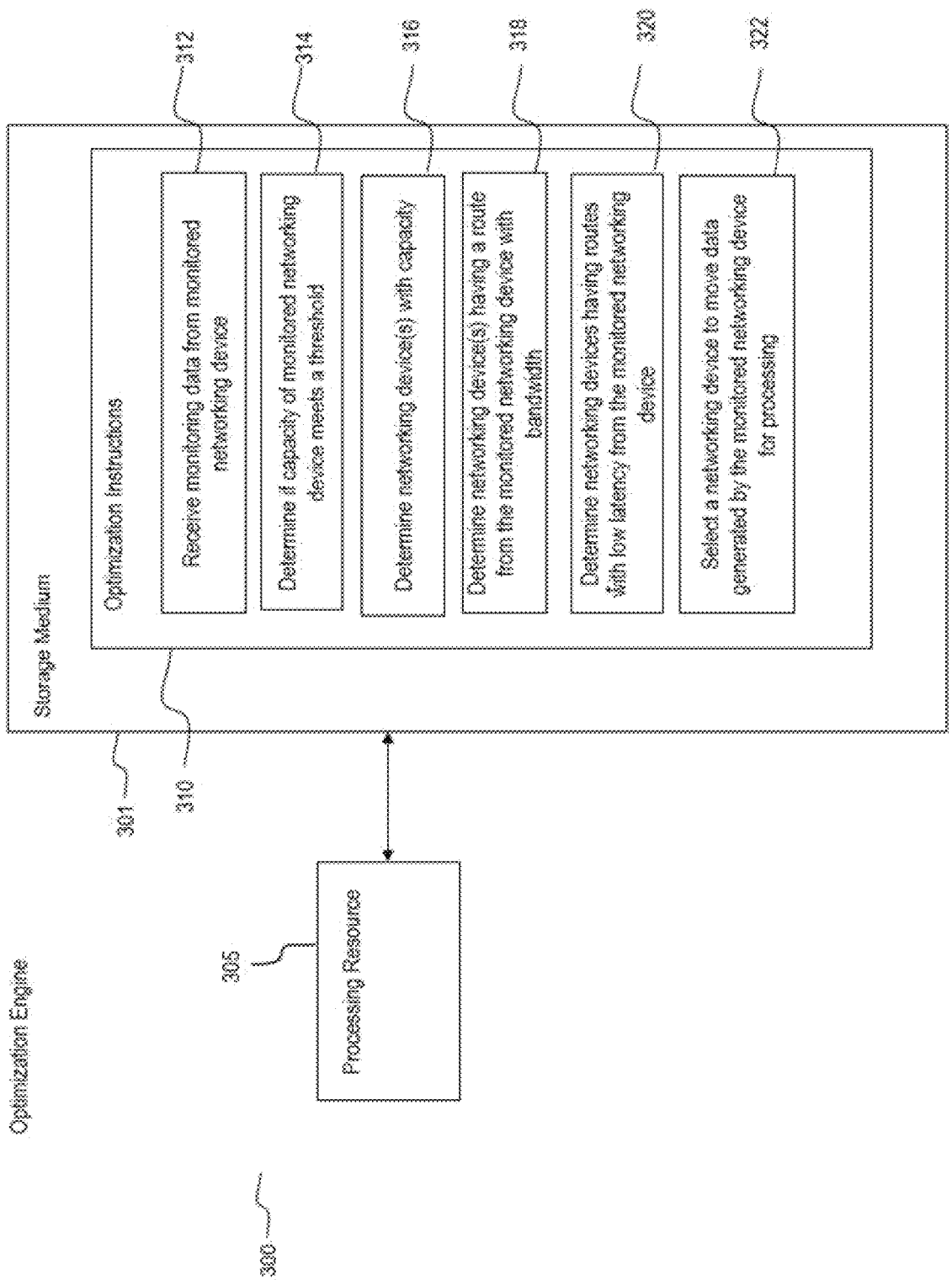
FIG. 2 is a block diagram illustrating an optimization engine in accordance with the examples set forth herein.

FIG. 2 illustrates one example of the optimization engine 300 in greater detail. As shown in FIG. 2, the optimization engine 300 comprises a processing resource 305 (e.g., a processor, CPU, GPU, SoC, or other processing resources), and a storage medium 301 (e.g., a non-transitory computer-readable medium). The storage medium 301 comprises optimization instructions 310 to be executed by processing resource 305. Although optimization instructions 310 are shown in FIG. 2 together as part of the same storage medium 301 for ease of description, these may be provided separately in some examples. For example, the optimization engine 300 may comprise multiple computing systems.

The optimization instructions 310 include instructions 312 to receive, for instance, at the controller 500, monitoring data from monitoring agents 35, 45, 55, 65, and 75 of the networking devices 20. Specifically, the data is related to the computing capacity (e.g., consumed processing capacity, consumed memory capacity, or both) of the networking devices. In some examples, this data comprises (or is derived from) the monitoring data generated by specific monitoring agents 35, 45, 55, 65, and 75. Controller 500 stores the data, such as time series data, in data store 200. In one example, the monitoring agents 35, 45, 55, 65, and 75 collect data from a first set of networking devices. For example, the set of networking devices may comprise servers, switches, and smartNICs or any combination thereof. The set of networking devices may comprise the same types of devices (e.g., switches, servers and smartNICs) or may be a combination of different types of networking devices.

The optimization instructions include instructions 314, to determine if the computing capacity of each set of monitored networking devices 20 meets a threshold for total capacity. The threshold for total capacity may be a level of CPU processing and/or memory usage that may put the networking device at risk of being overwhelmed by its processing or memory capacity. Monitoring data received by the controller 500 for the monitoring metric indicates that the CPU processing level for a networking device exceeds a defined level of CPU processing being utilized. In some examples, the computing capacity information and corresponding thresholds may be expressed in terms of percentages of total available capacity (e.g., percent of processor usage, percent of memory usage, or both). In some examples, the thresholds may be a percentage of processing capacity and memory capacity. For example, in some implementations the threshold is 80% of processing capacity and memory capacity. In some examples, the thresholds are defined by a manufacturer/developer of the optimization engine 300, and in some examples, the thresholds are user definable (e.g., by an administrator of the system 10).

The optimization instructions 310 further comprise instructions 316 to determine networking devices with sufficient available computing capacity for processing monitoring data of another networking device. The available computing capacity may refer to available processing capacity, available memory capacity, or both. The networking device may have sufficient available computing capacity if it has available computing capacity (i.e., total computing capacity minus consumed computing capacity) that exceeds a threshold. The threshold may be a fixed value or a variable value that varies depending on the specific monitoring data that needs to be reassigned (e.g., in some cases, some monitoring data may need more available capacity to process than other monitoring data). For example, optimization engine 300 determines networking devices that have excess processing capacity, such as networking device that is currently less loaded. Therefore network monitoring can still occur for each network device even when some devices are too loaded to perform the monitoring themselves.

The optimization instructions 310 further comprise instructions 318 to determine if the bandwidth of the route or link from a monitored networking device that is overloaded to a networking device with available capacity satisfies a bandwidth threshold. For example, the optimization engine 300 determines if the route or link from a monitored networking device that is overloaded to a device with available capacity can support a specified rate of transferring the amount of monitoring data using an available route or link. If the route has sufficient bandwidth, then the networking device with available capacity is retained as a candidate to receive and process the monitoring data of the overloaded networking device. If there is no valid route between the networking device with available capacity and the overloaded networking device, or if there is a route but it has insufficient bandwidth, then the networking device with available capacity is excluded as a candidate to receive and process the monitoring data of the overloaded networking device. This may be repeated for each networking device found to have available capacity.

The optimization instructions 310 further comprise instructions 320 to determine if the latency of the route or link from a monitored networking device that is overloaded to a networking device with available capacity satisfies a latency threshold. For example, an optimization engine determines if the route or link from the monitored networking device to a device with availability can be transmitted quickly and efficiently. If the route satisfies the latency threshold, then the networking device with available capacity is retained as a candidate to receive and process the monitoring data of the overloaded networking device. Suppose the route does not satisfy the latency threshold. In that case, the networking device with available capacity is excluded as a candidate to receive and process the monitoring data of the overloaded networking device. This may be repeated for each networking device found to have available capacity. Thus, instructions 316-320 collectively identify a set of networking devices that are suitable candidates for receiving and processing the monitoring data of the overloaded networking device.

Optimization instructions 310 further comprise instructions 322 to select a second networking device out of the candidate networking devices to receive and process the monitoring data from the monitored networking device that is overloaded. The monitored data is then transmitted to the selected second networking device with available capacity and the second networking device is caused to process the monitoring data. The second networking device selected has the capacity, route bandwidth and route latency to support moving the monitoring data for processing and makes efficient use of network resources.

Figure 8:
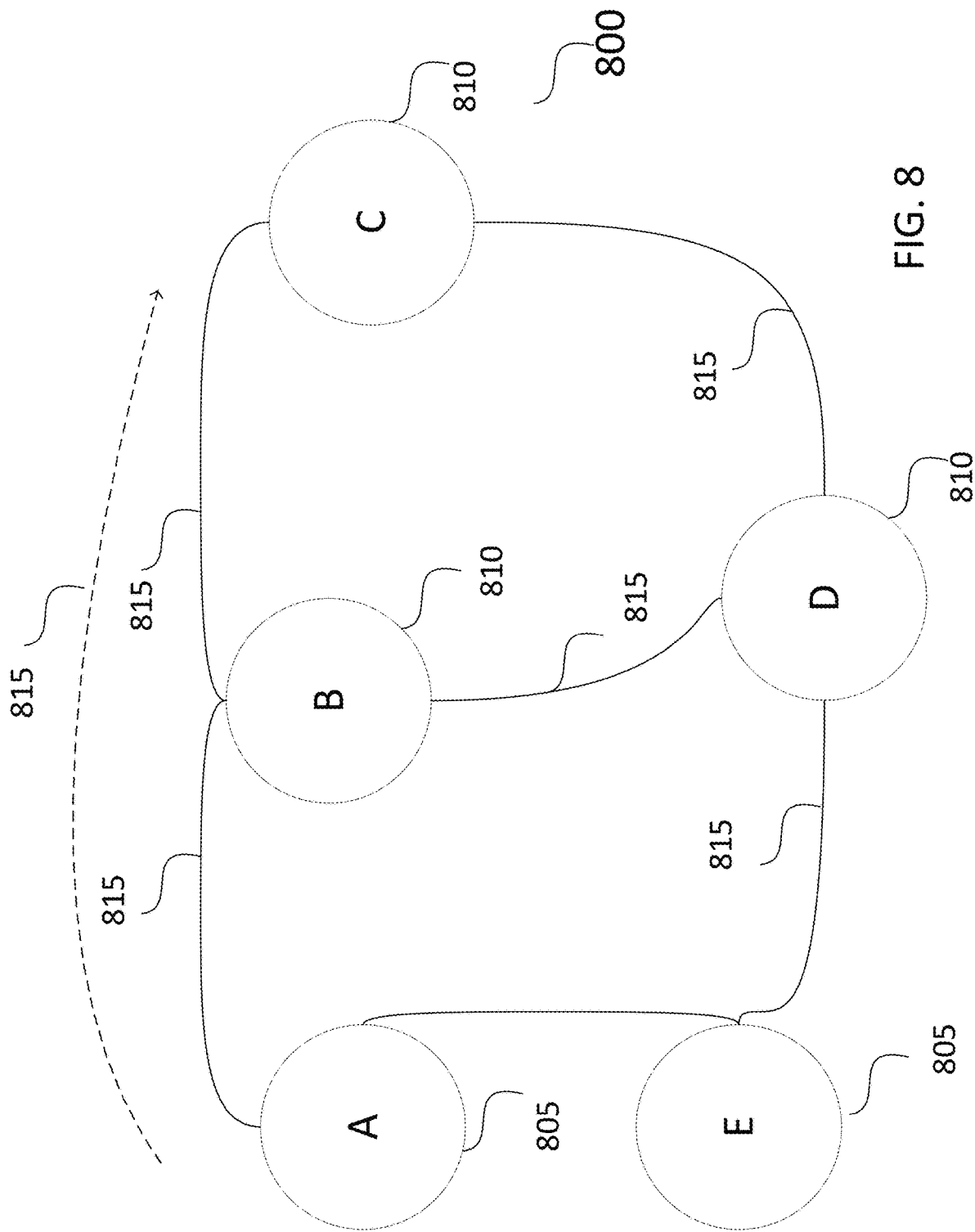
FIG. 8 is a diagram of networking devices for a monitoring placement problem in accordance with examples set forth herein.
Figure 9:
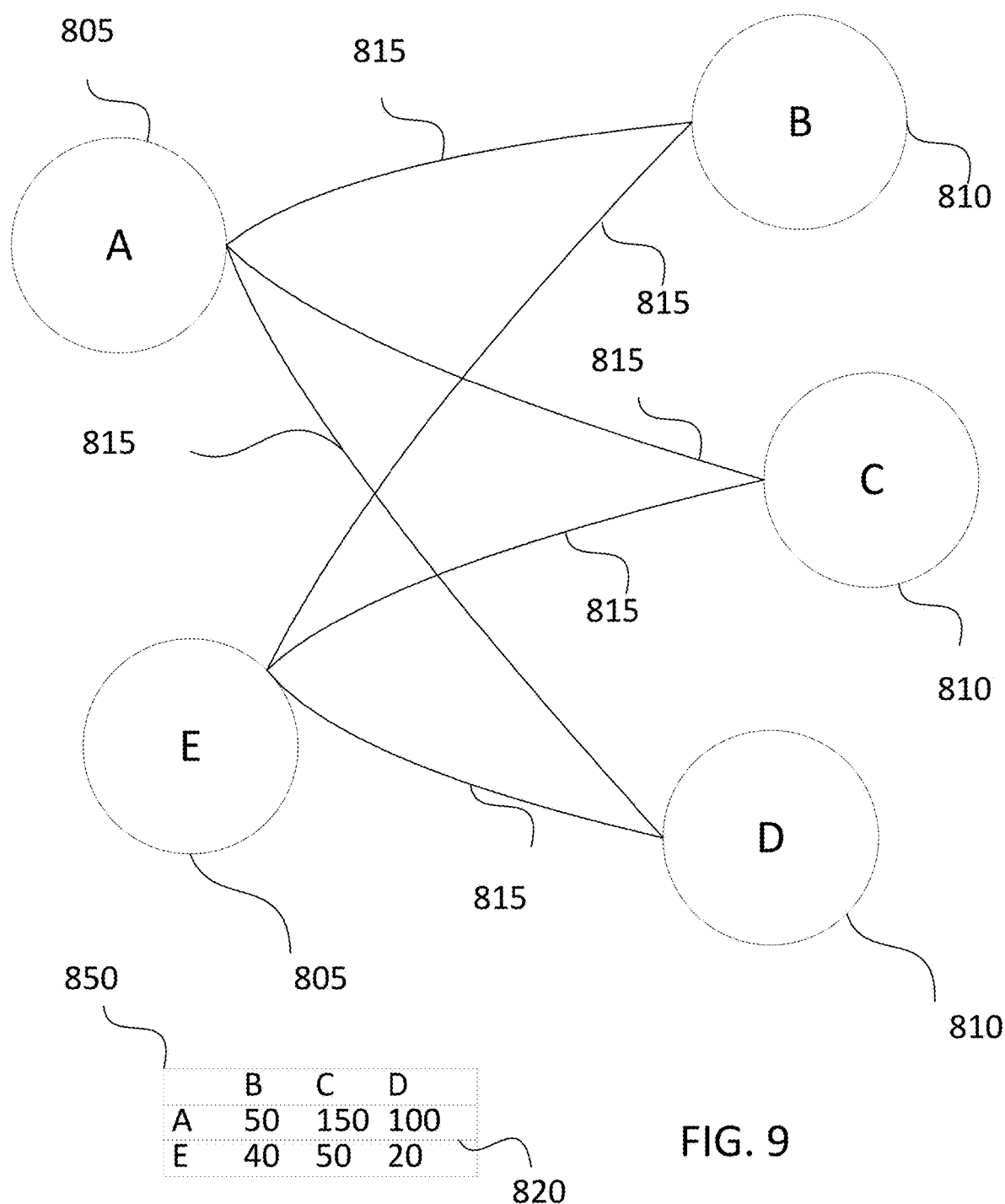
FIG. 9 is a diagram of a bipartite graph for monitoring placement problem in accordance with examples set forth herein.

In selecting the second networking device, the optimization engine 300 utilizes an optimization algorithm that models the problem using a bipartite graph G such as shown in FIGS. 8 and 9. With reference to FIG. 8, the graph 800 comprises a collection of vertices U (805) representing the networking device(s) whose monitoring data needs to be moved, a collection of vertices V (810) representing the networking devices which are candidates to receive the monitoring data, and edges E (815) connecting the vertices U (805) to the vertices V (810). In particular, for each pair of overloaded networking device in U (805) and candidate networking device in V (810), it is determined if a route exists between the pair of devices that satisfies bandwidth and latency requirements. If so an edge E (or link) (815) is created in the graph connecting these two networking devices. Referring next to FIG. 9, for each of these edges E (815), an estimated cost (820) to move the monitoring data along the associated networking device with the route (815) is determined. In some examples, the cost (820) associated with each link (815) in the bipartite graph (850) can be the latency to move the monitoring data along the associated nodes or in some examples, it can be to total amount of data (in bytes) that is being moved, or a weighted cost model for each node, etc. The bipartite graph (850) may be used by the optimization engine to determine the cost of moving the generated data from a monitored networking device in U (805) to another networking device in V (810), and an optimal solution may be determined that minimizes the total cost to the system, with cost being measured in terms of data movement (e.g., total time to move the monitoring data, or total amount of data being moved). For example, the optimization engine may utilize the Hungarian approach to determine the optimal pairings. The objective of the optimization algorithm is to minimize data movement from the busy networking device to a networking device with capacity so that the monitoring data of the busy networking node is moved to the closest networking device with availability.

To solve the complexity of $\Omega(n!)$, the time complexity is reduced to the worst case $O(n^3)$ using a modified Hungarian approach to solve the assignment problem. Let there be n available nodes and n monitoring tasks. Any available node can be assigned to perform any monitoring task, incurring some cost is defined based on the data movement latency. It is required to perform all monitoring tasks by assigning exactly one available node to each task and exactly one monitoring task to each available node in such a way that the total cost of the assignment is minimized. A brute force solution is used to consider every possible assignment implies a complexity of $\Omega(n!)$!

We can reduce the time complexity to worst case O(n3). A brute force solution considers every possible assignment and includes the following steps.

Step 1: For each row of the matrix (850), find the smallest element and subtract it from every element in its row.

Step 2: Do the same (as step 1) for all columns.

Step 3: Cover all zeros in the matrix using minimum number of horizontal and vertical lines.

Step 4: Test for Optimality: If the minimum number of covering lines is n, an optimal assignment is possible, and we are finished. Else if lines are lesser than n, we haven't found the optimal assignment, and must proceed to step 5.

Step 5: Determine the smallest entry not covered by any line. Subtract this entry from each uncovered row, and then add it to each covered column. Return to step 3.

In exemplary FIGS. 8 and 9, a group of networking devices A, B, C, D and E are part of an exemplary network with known routes (815). In this example, optimization engine has determined that the total capacity of networking devices (U) A and E (805) exceed a threshold and the monitoring data for networking device A and E (805) needs moved to a networking device (810) with compute capacity. Networking device A has 500 MB data to be moved and networking device E has 100 MB data to be moved. Optimization engine determines that networking devices (V) C, D, and E (810) of FIG. 8 have compute capacity.

As shown in FIG. 9, a bipartite graph 850 may be used by the optimization engine to determine the cost of moving the generated data from a monitored networking devices U (A and E) (805) to another networking device in V (B, C, and D) (810), and an optimal solution may be determined that minimizes the total cost to the system, with cost being measured in terms of data movement (e.g., total time to move the monitoring data, or total amount of data being moved). FIG. 9 depicts a weighted matrix showing the cost (820) of data movement from networking device i to networking node j. For example, the cost to move monitoring data from networking node A to networking node B is 50 seconds, from networking node A to networking node C is 150 seconds and networking node D is 100 seconds. In this example, the cost to move monitoring data from networking node E to networking node B is 40 seconds, from networking node E to networking node C is 50 seconds and from networking node E to networking node D is 20 seconds. A modified Hungarian approach described above is then applied to the bipartite graph (850) of FIG. 9 determine the optimal networking device to move the monitoring data.

With reference to FIGS. 3-7, in an example, the networking devices include different types of devices: server networking devices (set) 305, smartNICs ($sm_i$) 315, and switches ($sw_i$) 330. In this example, each switch networking device $sw_j$ 330 comprises a monitoring agent that is monitoring a metric for TX/RX passed/drop. The monitoring strategy for this monitoring metric is for monitoring agent for each switch in a network to collect data for TX/RX passed/drop metrics.

Figure 3:
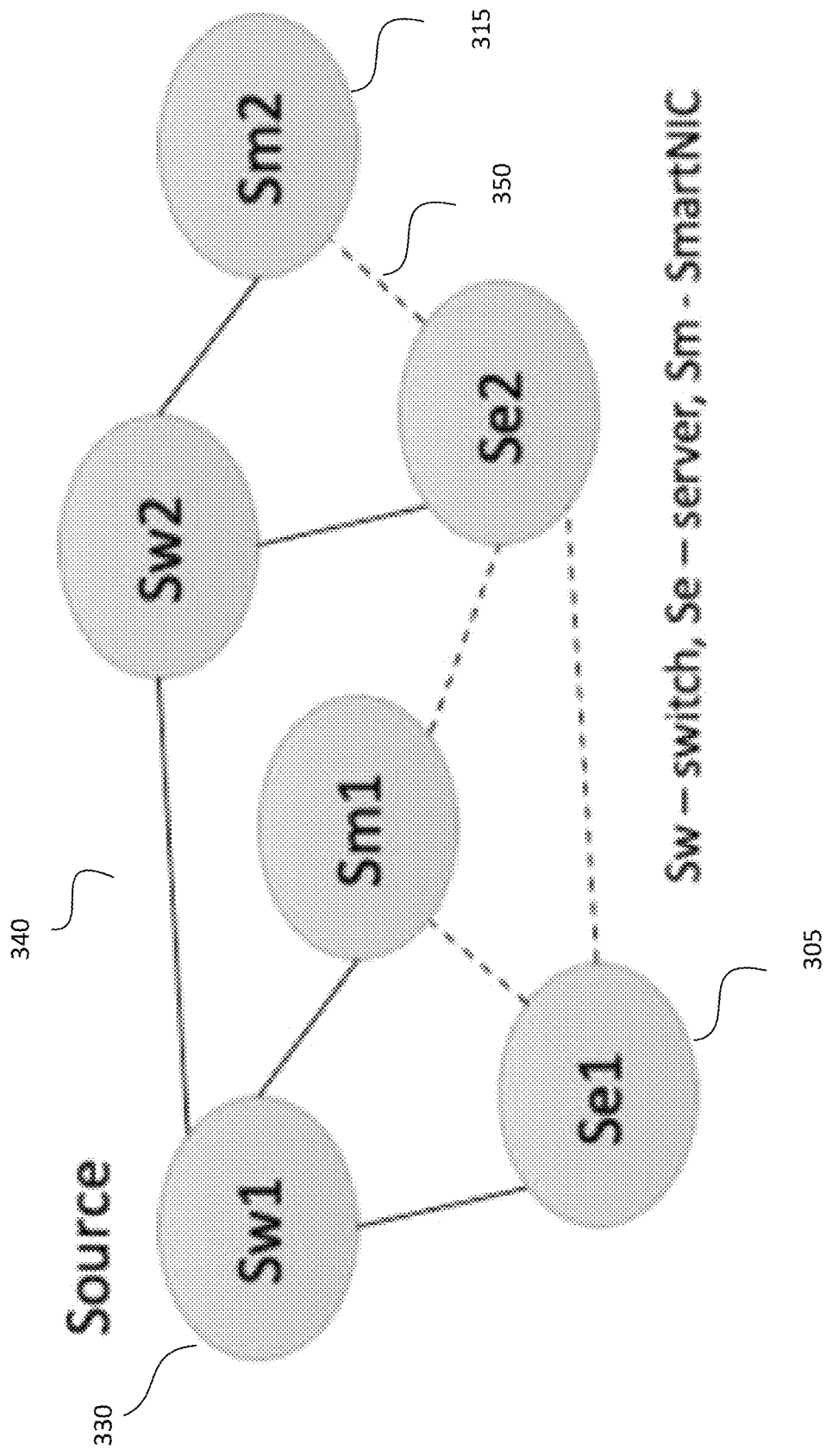
FIG. 3 is a diagram of a full mesh topology network in accordance with the examples set forth herein.

Continuing the example above, if any switches ($sw_i$) are overloaded (their consumed computing capacity exceeds a threshold), the optimization engine determines and selects alternative networking devices (e.g., devices se1, se2, sm1, sm2 or other sw) to process the monitoring metrics for the busy switches ($sw_i$). In FIG. 3, the networking devices can communicate with each other, forming a topology 340. In some examples, the network devices have a full mesh topology or a general topology with defined routes. In a full mesh topology, all networking devices in the network can communicate with one another through one hop. In a general topology, any networking device is connected to any other networking device in the network, but all networking devices cannot communicate directly (through one hop) with one another. Defined (or uncontrollable) routes (350) are routes that require data to flow in a defined direction from one networking device to another networking device.

The weight of each edge (E) is determined by factors including amount of monitoring data to be moved per second, networking device capacity, latency to remote networking device, and link bandwidth connecting source and remote monitoring networking device.

Suppose that the capacity of each node, i is specified by ci, and the latency of edge ij is specified by $L_{ij}$ and its bandwidth is bij and where monitoring delay from networking i to j is not to be more than dij. The optimization algorithm places the monitoring in a networking device that requires minimum data movement, $m_{ij}$ (i.e., monitoring networking device i on node j due to the resource constraints), which is formulated as shown below.

$$\text{Min} \sum_{(i,j) \in E} D_{ij} \cdot m_{ij}$$

s.t.:

$$\sum_{(i) \in V} P_i \cdot m_{ij} \le c_j, \forall (j) \in V$$

$$D_{ij} \cdot m_{ij} \le b_{ij}, \forall (i, j) \in E$$

$$L_{ij} \cdot m_{ij} \le d_{ij}, \forall (i, j) \in E$$

$$m_{ij} \in \{0, 1\}, \forall (i) \in U, \forall (j) \in V,$$

Where $m_{ij}$ is a binary variable that specifies the decision to monitor networking device i using networking device j if $m_{ij}==1$; $D_{ij}$ specifies the data (in bits) that needs to be exchanged from networking device i to networking device j, and $P_i$ shows the computation load for monitoring networking device i by j. Based on the output of the optimization algorithm, monitoring data for networking devices at capacity is pushed to networking devices with available capacity to be processed.

In addition to pushing monitoring data to networking devices with capacity for processing, the optimization algorithm determines alternative networking devices for processing monitoring data should a networking device be unavailable or go down for fault tolerance. Utilizing the optimization algorithm, a traditional formula 2f+1 is used to determine the number of alternative networking devices (replicas). In this example, three alternative networking devices (replicas) are selected. To find alternative networking devices in the system, the optimization algorithm is run with a constraint not to choose the first selected networking device (mij=0). It runs the optimization algorithm f times to select the f networking devices as alternatives. To evaluate the performance benefits of the optimization algorithm, a high-performance data center top-of-rack (ToR) switch 8325 (with 8 CPU cores, 16 GB RAM, and 64 GB SSD disk specs), and running bidirectional 20% line rate east-west VxLAN (overlay) traffic in a spine-leaf architecture was evaluated. Ten different monitoring agents were instantiated on networking devices, and resource utilization was evaluated by enabling monitoring agents on the networking devices. The results were evaluated for individual networking device performance and overall network performance. The evaluation showed substantial improvement in utilized resources with respect to CPU and memory usage per program and the average used resource, which indicates that the optimization algorithm properly offloads monitoring data processing when a networking device, such as a switch, is busy. The networking devices, in this instance a top-of-rack (ToR) switch 8325 (with 8 CPU cores) evaluated had both CPU and Memory.

The monitoring agents consumed around 100% of the CPU, reaching up to the peak of 600% for the ToR switch with 8 CPU cores; while zero percent of the CPU was used utilizing the optimization algorithm.

The average computing utilization (consumed computing capacity) of the network as calculated for two cases: (a) a first case in which the optimization algorithm described above is used where the monitoring data (time-series DB) is offloaded to another networking device with capacity (such as a smart fabric device) and (b) a second case in which such offloading is not done (i.e., all monitoring and processing is performed within a local networking device (switch)). The average memory usage and average CPU usage using the optimization algorithm to move monitoring data processing to other networking devices is lower than the average memory usage and average CPU usage when the monitoring data processing remained on the local networking device.

Figure 4:
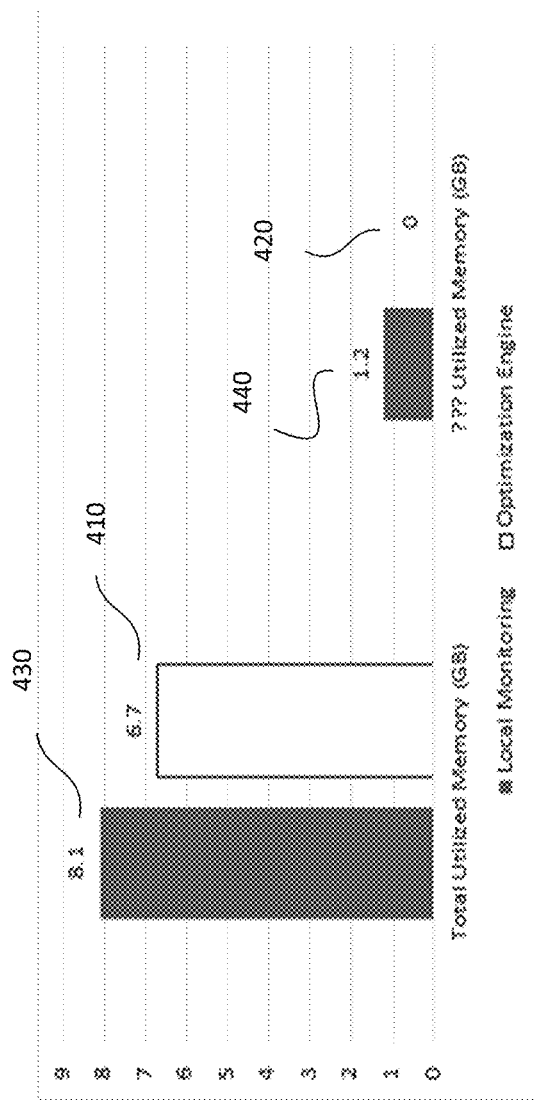
FIG. 4 is a diagram of a networking device's memory usage when data processing is offloaded using the optimization algorithm compared to when monitoring data processing is performed by the networking device.

With reference to FIG. 4, with use of the optimization algorithm and offloading processing of monitoring data from a networking device, the total memory used by programs of the networking device stays in 6.7 GiB after 12 hours (410) and zero dedicated monitoring memory use (420). Without use of the optimization and offloading, the memory used with the agents running locally gradually raised up to 8.1 GiB (430) with use of 1.2 GiB dedicated monitoring memory use (440).

In less than 24 hours, the total memory utilization over 12 hours of the networking device of FIG. 4 being monitored locally exceeded the device solid state drive (SSD) limit and resulted in 'Unknown' state for all monitoring services, and no more monitoring data was collected. This was followed by shutdown of the networking device and network downtime. When the optimization algorithm is used, the total memory remained unchanged for the networking device of FIG. 4, no errors occurred, and monitoring data continued to be collected.

Figure 5:
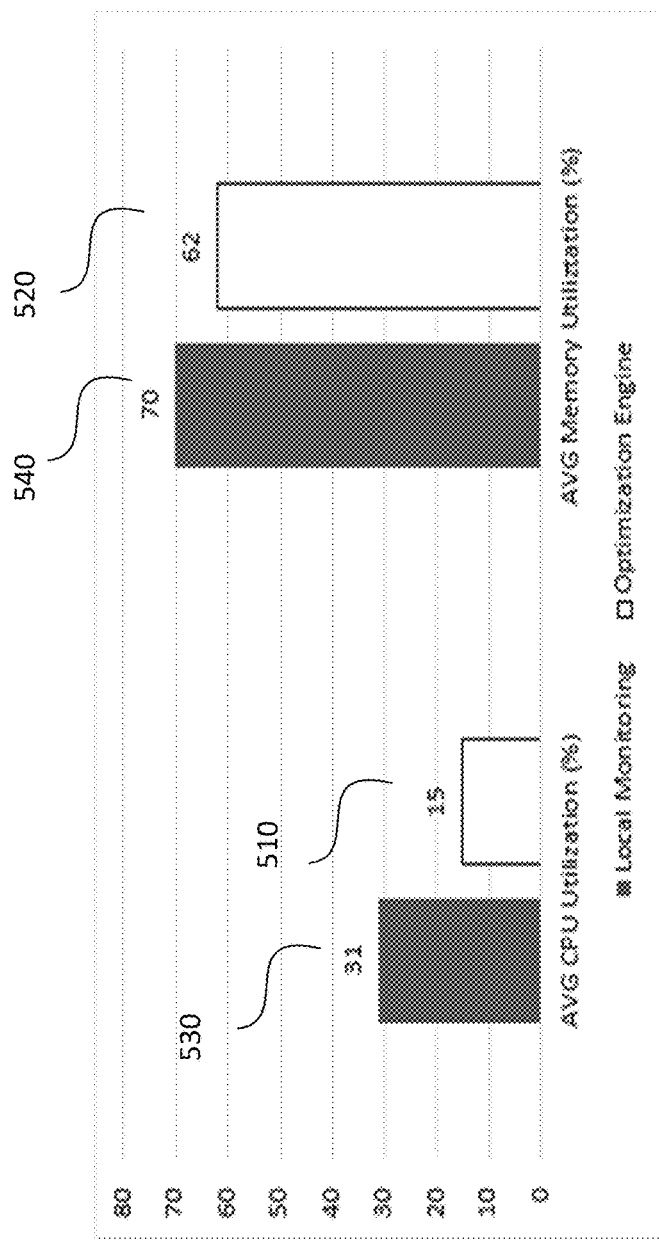
FIG. 5 is a diagram of the average memory usage and CPU usage when monitoring data processing is offloaded using the optimization algorithm compared to when monitoring data processing is not offloaded.

Referring next to FIG. 5, using the optimization algorithm, the average CPU and memory usage is 15% (510) and 62% (520) for offloading monitoring data processing from switches to smartNICs; and 31% (530) and 70% (540) when monitoring data is processed locally on switches. Overall, the optimization algorithm provided 50% of CPU savings and 15% in memory by offloading monitoring data processing from switches to smart fabric devices, such as smartNICs and Smart ASICs.

The optimization algorithm of optimization engine 300 may be implemented across networking devices in network and can assist with proper deployment of smartNICs to offload processing monitoring data from switches in the network. The optimization algorithm and deployment of smart fabric devices, such as smartNICs and Smart ASICS, can minimize the cost of monitoring data movement, such that the processing of monitoring data can be moved from switches to smart fabric devices to keep the CPU and memory of servers available for data processing.

Utilization of the optimization algorithm helps limit memory leaks and a great deal of high CPU usage. The optimization algorithm and use of smart fabric devices to offload processing from switches can be utilized in private and public cloud networks for efficient network monitoring. The intelligent optimization algorithm can be utilized to inform network distribution policies and reroute network traffic to available networking devices, improving the network's efficiency.

Figure 6:
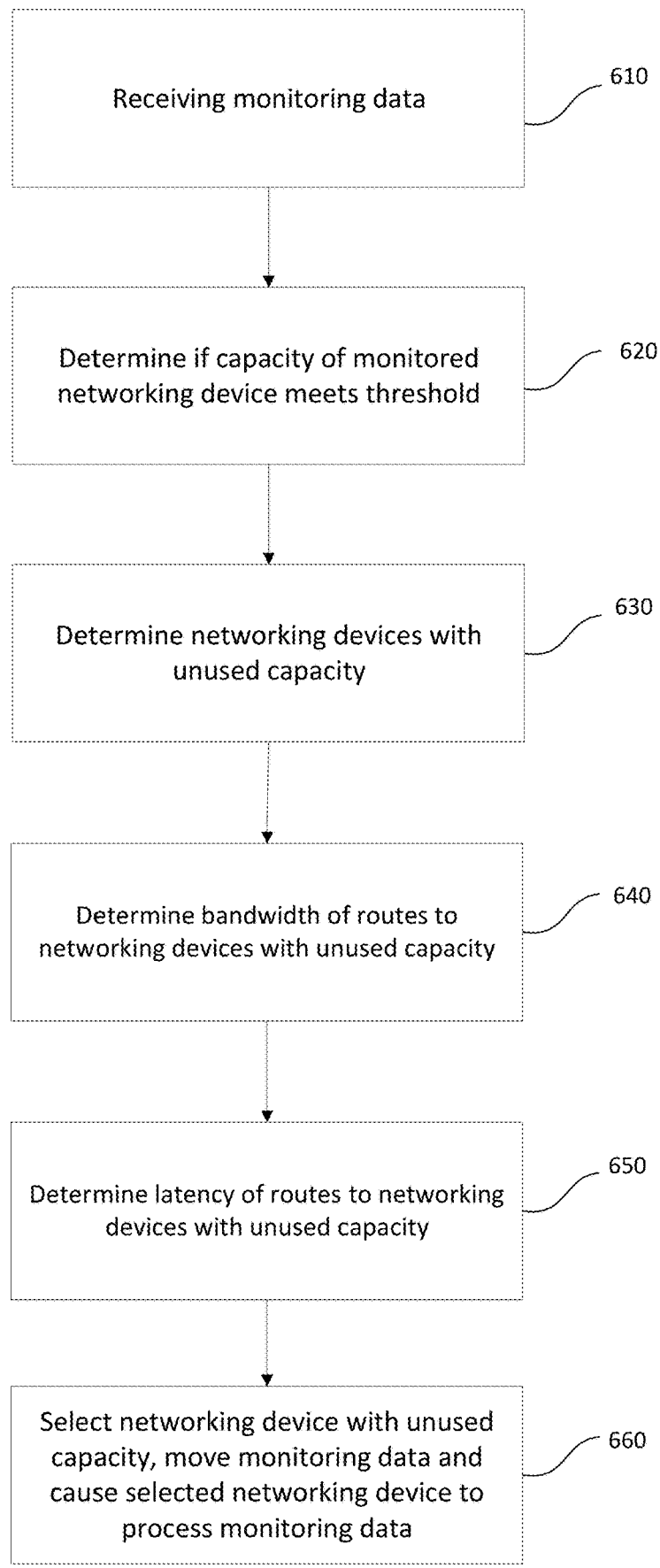
FIG. 6 is a flow diagram of a method for moving monitoring data generated by a first networking device to a second networking device for processing in accordance with the examples set forth herein.

FIG. 6 is a flow diagram illustrating a method for moving monitoring data from a monitored networking device to a networking device with available capacity for processing the monitored data in accordance with the examples set forth herein. The method may be performed by any suitable processor or hardware discussed herein, such as a processor or hardware included in optimization engine 300. In particular, in some examples, the optimization engine 300 or components thereof are instantiated by one or more processors executing machine-readable instructions that comprise, at least in part, instructions corresponding to the operations of the method of FIG. 6. The method is described below in relation to a first networking device for convenience, but it should be understood that the method could be performed for multiple networking devices concurrently.

A method starts in block 610, in which the optimization engine 300 receives network information about the network from one or more networking devices. The network information about the network may comprise information about the current state of the network, network topology, link reachability and availability, and current resource utilizations of all the nodes. In one example, the networking information includes information about at least a first networking device that has one or more monitoring agents installed thereon. The network information may be accessed from data store 200.

In block 620, the optimization engine 300 determines if the first networking device satisfies a threshold of total capacity for processing monitoring data. This determination may be made based on the networking information received in block 610. The threshold for total capacity may be a level of CPU processing and/or memory usage that may put the networking device at risk of being overwhelmed by its processing or memory capacity. More specifically, the first networking device may be considered as satisfying the threshold for total capacity if the level of CPU and/or memory usage exceeds, or in some examples is equal-to-or-exceeds, respective CPU and Memory utilization thresholds. In some examples, only CPU utilization is considered. In other cases, only memory utilization is considered. In still other examples, both CPU utilization and Memory utilization are considered. In some examples in which both CPU and Memory utilization are considered, the first networking device may be considered as satisfying the threshold for total capacity if either of the CPU or the Memory utilization exceeds (or equals in some cases) their respective CPU and Memory thresholds. In some examples, the CPU and Memory thresholds may be specified as percentages of total capacity for the networking device. In some examples, the CPU and Memory thresholds may be the same as one another. In some examples, the CPU and Memory thresholds may be different from one another. If the first networking device does not meet the threshold, then the method 600 may end for the first networking device (although the method 600 may proceed for other networking devices if the method 600 is being performed for multiple networking devices concurrently). For the remaining steps of method 600, it is assumed that the first networking device satisfies the threshold (i.e., either the CPU utilization, the memory utilization, or both exceed respective thresholds therefor).

In block 630, the optimization engine 300 determines networking devices in the network with unused capacity based on the networking information received in block 610. For example, the optimization engine determines networking devices that have excess processing capacity, such as those that are currently less loaded. In some examples, networking devices may be determined to have unused capacity if their CPU and/or memory utilization are less than respective second CPU and Memory thresholds. Therefore network monitoring can still occur for each network devices even when some devices are too loaded to perform the monitoring themselves. Optimization engine 300 determines devices that have enough capacity for processing the monitoring data generated by the first networking device.

In block 640, the optimization engine 300 determines the bandwidth of the routes from the first networking device to each of the networking devices with unused capacity. The optimization engine 300 determines if any of the bandwidths of these routes or links from the first networking device to the networking devices with available capacity satisfies a bandwidth threshold. For example, the optimization engine 300 determines if the route or link from a monitored networking device to a device with available capacity can support a threshold rate of transferring the amount of monitoring data using an available route or link.

In block 650, the optimization engine 300 determines, for each of the routes or links from the first networking device to a networking device with available capacity that satisfied the bandwidth threshold in block 640, if the respective route or link satisfies a latency threshold. For example, optimization engine 300 determines if the route or link from the monitored networking device to a device with availability can be transmitted quickly and efficiently.

In block 660, the optimization engine 300 selects a second networking device to receive the offloaded monitoring data moved from the first networking device, wherein the second networking devices is selected based at least in part on the second networking devices having available capacity (as determined in block 630) and there being a route between the first and second networking devices that satisfies the bandwidth and latency thresholds (as determined in blocks 640-650). In addition, in some examples, the optimization engine 300 is performing the method 600 concurrently for multiple networking devices that need to offload monitoring data, and in such examples the optimization engine 300 may select the second networking device to receive the offloaded monitoring data from the first networking device so as to minimize an overall cost to the network for the movement of all the monitoring data of these devices, as described above. After selecting the second networking devices, the monitored data is transmitted from the first networking device to the second networking device, and the second networking device is caused to process the monitoring data. The second networking device selected has the capacity, route bandwidth, and route latency to support moving the monitoring data for processing and efficiently use network resources.

Figure 7:
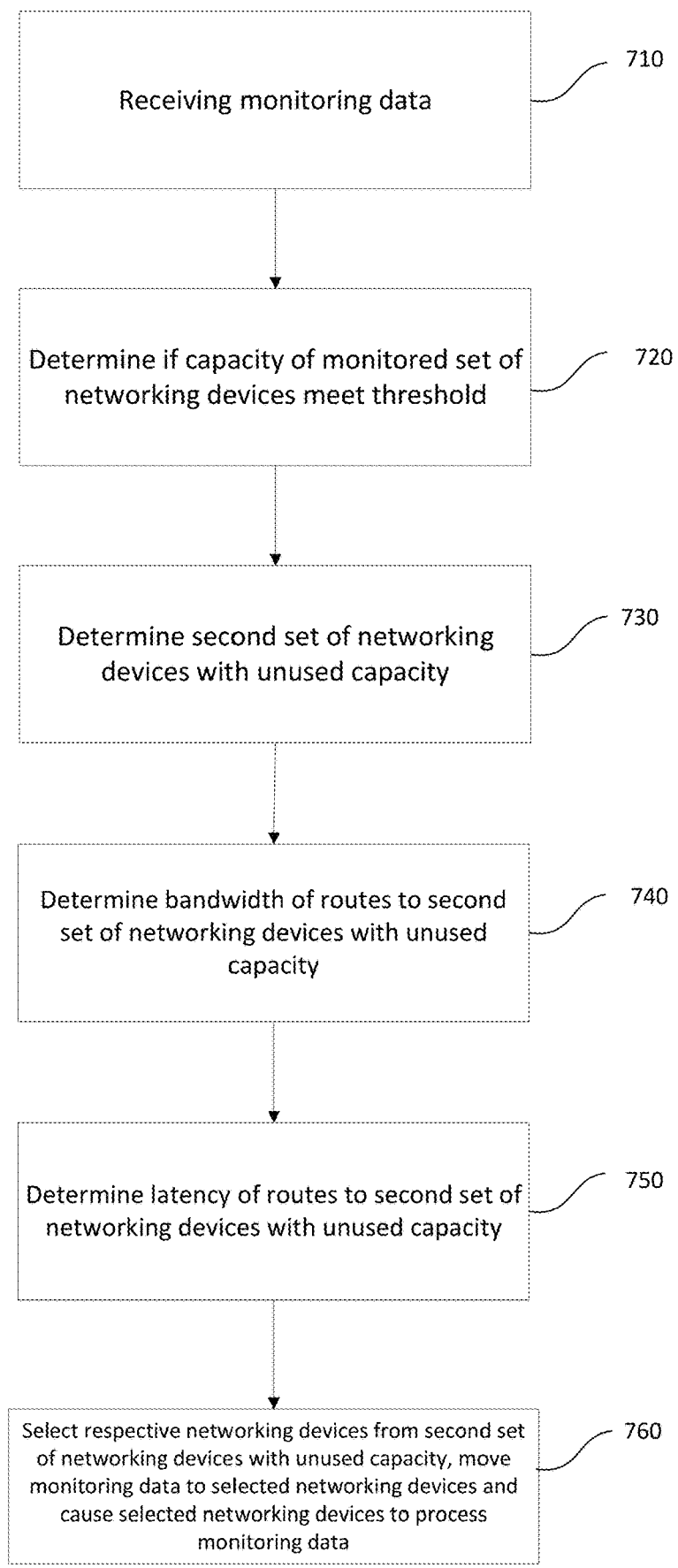
FIG. 7 is a flow diagram of a method for moving the monitoring data generated by the first set of networking devices to a second set of networking devices in accordance with the examples set forth herein.

FIG. 7 is a flow diagram illustrating a method for moving monitoring data from monitored networking devices to networking devices with available capacity for processing the monitored data in accordance with the examples set forth herein. The method may be performed by any suitable processor or hardware discussed herein, such as a processor or hardware included in optimization engine 300. In particular, in some examples, the optimization engine 300 or components thereof are instantiated by one or more processors executing machine-readable instructions that comprise, at least in part, instructions corresponding to the operations of the method of FIG. 7.

A method starts in block 710, in which the optimization engine 300 receives networking information about the network. The network information may comprise information about the current state of the network, network topology, link reachability and availability, and current resource utilizations of all the nodes. In one example, the networking information includes information about at least a first set networking device that has one or more monitoring agents installed thereon. In some examples, the networking information includes information about all of the networking devices in the network that have monitoring agents installed thereon.

In block 720, the optimization engine 300 determines which of the networking devices out of a group of networking devices in the network (in some examples, all of the networking devices that have monitoring agents installed thereon) meets (i.e., satisfies) a threshold of total capacity for processing monitoring data. The networking devices that meet the threshold may be referred to herein as a first set of networking devices, and thus block 720 may be restated as the optimization engine 300 identifying a first set of networking devices that meets the threshold. A given networking device may be considered as satisfying the threshold for total capacity if the level of CPU and/or memory usage thereof exceeds, or in some examples is equal-to-or-exceeds, respective CPU and Memory utilization thresholds. In some examples, only CPU utilization is considered. In other cases, only memory utilization is considered. In still other examples, both CPU utilization and Memory utilization are considered. In some examples in which both CPU and Memory utilization are considered, the given networking device may be considered as satisfying the threshold for total capacity if either of the CPU or the Memory utilization exceeds (or equals in some cases) their respective CPU and Memory thresholds. In some examples, the CPU and Memory thresholds may be specified as percentages of total capacity for the networking device. In some examples, the CPU and Memory thresholds may be the same as one another. In some examples, the CPU and Memory thresholds may be different from one another.

In block 730, the optimization engine 300 determines a second set of networking devices in network with unused capacity. For example, optimization engine determines networking devices that have excess processing capacity, such as networking device that is currently less loaded, and therefore network monitoring can still occur for each network devices even when some devices are too loaded to perform the monitoring themselves. In some examples, networking devices may be determined to have unused capacity if their CPU and/or memory utilization are less than respective second CPU and Memory thresholds. Optimization engine 300 determines a second set of networking devices that have enough capacity for processing the monitoring data generated by the first set of networking devices.

In block 740, the optimization engine 300 determines the respective bandwidths of the routes from each of the set of first networking devices to each of the respective networking devices of the second set of networking with unused capacity. Optimization engine 300 determines, for each of these routes between the networking devices of the first and second sets, if the bandwidth of the route or link satisfies a bandwidth threshold. For example, an optimization engine determines if the route or link from a monitored networking device to a device with available capacity can support a rate of transferring the amount monitoring data using an available route or link.

In block 750, the optimization engine 300 determines, for each route or link that satisfied the bandwidth threshold in block 740, if the latency of the route or link city satisfies a latency threshold. For example, optimization engine 300 determines if the route or ink from the monitored networking device to a device with availability can be transmitted quickly and efficiently.

In block 760, the optimization engine 300 selects respective networking devices from the second set of networking devices to receive offloaded monitoring data from the networking devices of the first set. The networking devices that are selected to receive the offloaded monitoring data may be selected based on the bandwidths and/or latencies of the various routes between the networking devices, as determined in blocks 640 and 650. More specifically, in some examples, for each networking device of the first set, a corresponding networking device from the set is selected to receive the offloaded monitoring data on condition of a route between the two devices satisfying a bandwidth and latency threshold. In addition, in some examples, the optimization engine 300 will match up the networking devices that are to receive the offloaded data with the networking devices that are to offload their data so as to minimize an overall cost to the network for the movement of all of the monitoring data between these devices, as described above. Each networking device in the first set may have at least one corresponding networking device from the second set assigned thereto to receive the monitoring data therefrom. However, the assignment of the networking devices of the second set (which receive the offloaded data) to the networking devices of the first set (which offload the monitoring data) is not necessarily limited to only one-to-one pairings. For example, it may be possible for a single networking device of the second set to be assigned to receive monitoring data from multiple networking devices of the first, assuming that the networking device has sufficient unused capacity and the other route conditions are satisfied. As another example, it may be possible for multiple networking devices of the second set to be assigned to receive monitoring data from the same networking device in the first set (e.g., the monitoring data from a first monitoring agent of a first networking device of the first set may be offloaded to a second networking device of the second set while the monitoring data from a second monitoring agent of the first networking device may be offloaded to a third networking device of the second set). The monitored data from the networking devices of the first set is transmitted to the selected networking devices from the set with available capacity, and the networking devices that receive the offloaded monitoring data are caused to process the monitoring data.

In some examples, the optimization engine 300 selects the networking devices from the second set of networking devices by using an optimization algorithm for a bipartite graph. The optimization algorithm models the problem as a bipartite graph with edges from the network devices in the first set (i.e., the networking devices determined to need their data offloaded) to each of the second set of networking devices in the network with unused computing capacity. A weight for the edges for each of the second set of networking devices comprises unused capacity for a networking device for a network from the second set of networking devices, latency from a networking device from the first set to a networking device from the second set, and link bandwidth from a networking device from the first set to a networking device from the second set.

The bipartite graph models a cost for moving monitoring data for each of the first set of networking devices to each networking device of a set of networking devices. The optimization engine determines the cost for moving monitoring data for each of the first set of networking devices is the amount of data to be moved from each of the first set of networking devices divided by the latency of the route between each of the first set of networking devices to each networking device of a second set of networking devices. The second networking devices selected have the capacity, route bandwidth, and route latency to support moving the monitoring data for processing and make efficient use of network resources. The methods, systems, devices, and equipment described herein may be implemented with, contain, or be executed by one or more computer systems. The methods described above may also be stored on a non-transitory computer-readable medium. Many of the elements may be, comprise, or include computer systems.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as Example. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the disclosure herein. It is intended that the specification and examples be considered as Example only, with the following claims being entitled to their fullest breadth, including equivalents, under the applicable law.

What is claimed is:

1. A non-transitory machine-readable storage medium comprising instructions that upon execution cause a system to:
receive computing capacity data from a plurality of networking devices in a network, wherein the plurality of networking devices comprise a first networking device comprising a monitoring agent to generate and process monitoring data for a monitoring metric at the first networking device;
determine, based on the received computing capacity data, whether a consumed computing capacity of the first networking device exceeds a threshold;
in response to the consumed computing capacity of the first networking device exceeding the threshold, identify, from among the plurality of networking devices, a set of networking devices with unused computing capacity sufficient for processing the monitoring data generated by the first networking device;
determine costs of moving the monitoring data across routes from the first networking device to respective networking devices of the set of networking devices;
select a second networking device from among the set of networking devices based on a cost function representing the costs; and based on the selecting, automatically move the monitoring data generated by the first networking device to the second networking device and cause the second networking device to process the monitoring data.

2. The non-transitory machine-readable storage medium of claim 1, wherein the cost function comprises a sum of the costs, wherein each respective cost of the costs is based on a product of a variable representing a decision to process the monitoring data of the first networking device using a respective networking device of the set of networking devices, and a variable representing an amount of the monitoring data to be transferred from the first networking device to the respective networking device.

3. The non-transitory machine-readable storage medium of claim 2, wherein the selecting of the second networking device from among the set of networking devices is further based on a constraint specifying that a route from the first networking device to the second networking device is lower than a latency threshold.

4. The non-transitory machine-readable storage medium of claim 2, wherein the selecting of the second networking device from among the set of networking devices is based on minimizing the cost function.

5. The non-transitory machine-readable storage medium of claim 1, wherein the identifying of the set of networking devices from among the plurality of networking devices comprises identifying a corresponding networking device, of the plurality of networking devices, having an unused computing capacity that exceeds a capacity threshold, wherein the unused computing capacity of the corresponding networking device is based on a total computing capacity of the respective networking device minus a consumed computing capacity of the corresponding networking device.

6. The non-transitory machine-readable storage medium of claim 1, wherein the processing of the monitoring data by the second networking device comprises initiating a corrective action based on the monitoring data.

7. The non-transitory machine-readable storage medium of claim 1, wherein the monitoring metric is a measure of a health of the first networking device.

8. The non-transitory machine-readable storage medium of claim 1, wherein the identifying of the set of networking devices from among the plurality of networking devices comprises identifying a route from the first networking device to a corresponding networking device, of the plurality of networking devices, having a bandwidth that exceeds a bandwidth threshold.

9. The non-transitory machine-readable storage medium of claim 1, wherein the first or second networking device has a processor and is one of a switch, a router, an access point, or a smart fabric device including a smart networking interface card and a smart application-specific integrated circuit (ASIC).

10. The non-transitory machine-readable storage medium of claim 1, wherein the identifying of the set of networking devices and the selecting of the second networking device from among the set of networking devices uses an optimization algorithm that models the set of networking devices as vertices of a graph and routes among the set of networking devices as edges between the vertices.

11. The non-transitory machine-readable storage medium of claim 1, wherein the consumed computing capacity of the first networking device comprises data specifying a consumed processing capacity and a consumed memory capacity of the first networking device.

12. A system comprising:
a hardware processor; and
a non-transitory storage medium storing instructions executable on the hardware processor to:
receive computing capacity data from a plurality of networking devices in a network, wherein the plurality of networking devices comprise a first networking device comprising a monitoring agent to generate and process monitoring data for a monitoring metric at the first networking device;
determine, based on the received computing capacity data, whether a consumed computing capacity of the first networking device exceeds a threshold;
in response to the consumed computing capacity of the first networking device exceeding the threshold, select a second networking device from among the plurality of networking devices based on a cost function and constraints, the cost function representing costs of moving the monitoring data across routes from the first networking device to respective networking devices of the plurality of networking devices, and the constraints comprising a first constraint specifying that a candidate networking device to which the monitoring data is to be offloaded has sufficient unused computing capacity; and
based on the selecting, automatically move the monitoring data generated by the first networking device to the second networking device and cause the second networking device to process the monitoring data.

13. The system of claim 12, wherein the selecting of the second networking device comprises creating a bipartite graph comprising vertices representing candidate networking devices and edges between the vertices representing routes among the candidate networking devices.

14. The system of claim 13, wherein, for each respective edge of the edges, a weight for the respective edge is based on one or more of:
a latency of a route represented by the respective edge, or
a bandwidth of the route represented by the respective edge.

15. The system of claim 12, where the constraints further comprise a second constraint specifying that a latency of a route to the candidate networking device is less than a latency threshold.

16. The system of claim 12, wherein the cost function comprises a sum of the costs, wherein each respective cost of the costs is based on a product of a variable representing a decision to process the monitoring data of the first networking device using a respective networking device of the plurality of networking devices, and a variable representing an amount of the monitoring data to be transferred from the first networking device to the respective networking device.

17. The system of claim 16, wherein the selecting of the second networking device from among the plurality of networking devices is based on minimizing the cost function subject to the constraints.

18. A method comprising:
receiving, by a system comprising a hardware processor, computing capacity data from a plurality of networking devices in a network, wherein the plurality of networking devices comprise a first networking device comprising a monitoring agent to generate and process monitoring data for a monitoring metric at the first networking device;
determining, by the system based on the received computing capacity data, whether a consumed computing capacity of the first networking device exceeds a threshold;

based on the consumed computing capacity of the first networking device exceeding the threshold, identifying, from among the plurality of networking devices, a set of networking devices with unused computing capacity sufficient for processing the monitoring data generated by the first networking device;

determining, by the system, costs of moving the monitoring data across routes from the first networking device to respective networking devices of the set of networking devices; and selecting, by the system, a second networking device from among the set of networking devices based on a cost function representing the costs; and based on the selecting, automatically moving, by the system, the monitoring data generated by the first networking device to the second networking device and causing the second networking device to process the monitoring data.

19. The method of claim 18, wherein the cost function comprises a sum of the costs, wherein each respective cost of the costs is based on a product of a variable representing a decision to process the monitoring data of the first networking device using a respective networking device of the set of networking devices, and a variable representing an amount of the monitoring data to be transferred from the first networking device to the respective networking device.

* * * * *